Fig.1.

Inventors
ROBERT ERNEST YAPP &
EDWARD GEOFFREY METCALFE
BY Tweedale & Gerhardt
Attorneys

United States Patent Office 3,371,479
Patented Mar. 5, 1968

3,371,479
HYDROSTATIC TRANSMISSION AND
CONTROL THEREFOR
Robert E. Yapp, Solihull, and Edward G. Metcalfe, Cubbington, Leamington Spa, England, assignors to Massey-Ferguson Services N.V., Curacao, Netherlands, Antilles, a corporation of the Netherlands Antilles
Filed Jan. 19, 1966, Ser. No. 521,717
Claims priority, application Great Britain, Jan. 28, 1965, 3,868/65
9 Claims. (Cl. 60—19)

ABSTRACT OF THE DISCLOSURE

A hydrostatic transmission having a control to reduce the speed ratio during overload including a servo system responsive to the drop in pressure across the transmission motor. Compensation means are provided to correct for the fact that the pressure drop across the motor varies with the speed ratio at any given torque value.

This invention relates to hydrostatic transmissions and control means therefor.

A hydrostatic transmission system usually comprises a pump driven through an input by a prime mover, and a motor driven by the pump and adapted to drive a load through an output. Control means for the transmission is usually operable to vary the ratio betwen the speeds of the said input and output. When the prime mover is fitted to a vehicle, it usually takes the form of an internal combustion engine and, if the vehicle is a tractor or like robust vehicle, the engine is usually called upon to drive auxiliary apparatus such as pumps or electric generators.

An undesirable state of the transmission may arise if it is set to give a desired speed ratio and circumstances arise which impose an excessive load on the transmission and the prime mover. Under these conditions a relief valve, usually provided in the transmission, operates by high pressure developed in the transmission in overcoming the load or torque resistance. This is not a desirable arrangement. Further, if the whole of the power of the prime mover under certain conditions is employed by the transmission and a further demand for power is made upon it by auxiliary apparatus, the prime mover stalls.

According to the present invention we provide a hydrostatic transmission comprising a fluid pump, a fluid motor, main control means for regulating the speed ratio of the transmission and auxiliary control means operable to adjust the main control means so as to reduce said speed ratio in the event that the loading on the transmission exceeds a predetermined value, and fluid pressure means for sensing the occurrence of said event and automatically actuating said auxiliary control means.

Further, according to the present invention a hydrostatic transmission includes a fluid pump, a fluid motor, main or normal control means to regulate the speed ratio betwen the pump and motor, and auxiliary control means sensitive to the approximate or actual pressure drop across the motor and automatically operative to adjust the main or normal control means so as to prevent the transmission of torque in excess of a predetermined value.

Preferably, the pump and motor are of the type having a rotating block, a number of cylinders extending axially in the block, pistons fluid tightly slidable in the cylinders and arranged to project from the block into contact with a tiltable swash plate, the motor and pump swash plates are tiltable in a pre-determined manner with respect to their respective blocks and with respect to each other by the main control means, movable by an operator, and the main or normal control means includes cam means and follow-up hydraulic servo devices for tilting the swash plates in a predetermined manner, and a mechanical linkage having a control lever for moving the cam means.

The auxiliary control means may comprise an element movably responsive to the approximate or actual pressure drop in the transmission, and balanced against such movement by spring means, setting means operative on the element for selectively varying the pressure to which the element is responsive, secondary fluid pressure means operable on a part of the main control means to cause the latter to adjust the transmission so as to reduce the speed ratio of the transmission and valve means responsive to the position of said element to cause said secondary fluid pressure means to operate.

Still further, according to the present invention the combination of an internal combustion engine and hydrostatic transmission as aforesaid includes further auxiliary control means responsive to a signal derived from the engine and operative to reduce the speed ratio of the transmission when the maximum power that can be delivered by the engine is in danger of being exceeded by the power demand on the engine.

Preferably, the further auxiliary control means comprises further valve means movably responsive to the signal and balanced against such movement by further spring means to cause the aforesaid secondary fluid pressure means to operate on the normal control means to reduce the speed ratio of the transmission. The signal which is derived from the engine is then indicative of the power output of the engine and preferably takes the form of a fuel pressure originating from the fuel pump or fuel injection apparatus if the engine is of the fuel injection type.

Embodiments of the invention will now be described, by way of example, with reference to the accompanying diagrammatic drawings, in which.

Figure 1:
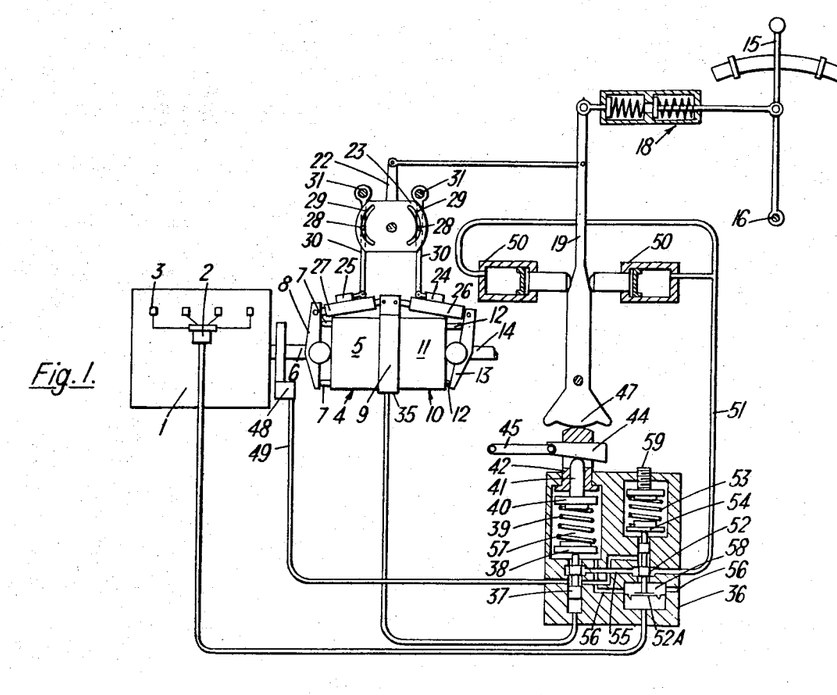
FIG. 1 shows the layout in part-sectional side view of one embodiment of a hydrostatic transmission and the controls therefor according to the present invention.

Referring to FIG. 1, an engine and hydrostatic transmission assembly consists in general of a diesel engine 1 equipped in known manner, with a fuel injection pump 2 and injectors 3 and coupled to a pump 4 of a hydrostatic transmission. The pump 4 has a rotating block 5 driven by a shaft 6 carrying pistons 7 fluid tightly slidable in cylinders formed in the block 5 and spring-urged outwardly into sliding abutment with a non-rotatable swash plate 8 which is angularly adjustable to vary the stroke of the pistons 7. A central valve housing 9 connects the pump 4 to the motor 10 of the transmission. The motor 10 has a rotating block 11, axially movable pistons 12 and an angularly adjustable swash plate 13, and is similar to the pump 4 though it may be bigger or smaller than the pump 4, dependent upon the installation. Power is carried to wheels of a vehicle, not shown, through an output shaft 14.

Main or normal control means for the hydrostatic transmission includes a hand lever 15 pivoted on a fixed point 16 on a vehicle and movable through an arc on each side of a central position. Centralising springs, not shown, operate to bias the lever 15 always towards the central position which corresponds to a neutral or "no-drive" condition of the transmission. A transmission linkage between the hand lever 15 and the transmission includes a preloaded strut and tie member 18 connected between the lever 15 and a cam lever 22. A control cam 23 moves with the cam lever 22 and conditions follow-up servo spool valves 24 and 25 to permit pressure fluid to flow to or from hydraulic rams 26 and 27 controlling the swash plates 8, 13. Each of the servo spool valves 24 and 25 has a follower pin 28 co-operating with cam slots 29 and a fluid pressure inlet, outlet and exhaust, not shown, the outlets connecting respectively with the rams 26 and 27. The follower pins 28 are provided on levers 30 pivotally attached at one end to the spools of the valves 24, 25 and at their other ends to stationary pins 31.

The main control is arranged so that on movement of the hand lever 15 away from the no-drive position, the cam 23 conditions the servo spool valve 25 to cause the ram 27 to move the pump swash plate 8 away from the position in which it is normal to the axis of the pump 4. Subsequent movement of the hand lever 15 causes the angle of the pump swash plate 8 to increase to a maximum and then for the angle of the motor swash plate 13 to decrease from a maximum to a minimum.

A foot pedal, not shown, pivoted on a fixed point may be used to operate the lever 15 through a link should it be necessary to leave the hands of the operator free.

In a conventional land vehicle such as an agricultural tractor having a stepped ratio transmission, wheel-spin on initial starting is avoided by using a clutch capable of allowing a degree of slip and by varying the engine power. Similarly, if wheel slip is encountered while the tractor is working, a suitable gear ratio is selected so that the torque applied by the engine at the wheels does not reach the torque required to make the wheels slip unduly.

In a vehicle with an infinitely variable hydrostatic transmission having an engine of fixed speed with adequate power available, it is inherent that the output torque of the transmission varies inversely with the output speed of the transmission for any constant power developed by the engine. The lower the ratio selected, the higher becomes the available output torque, and in the absence of a transmission clutch for controlling the power throughout, this leads to a difficult situation in that because of the progressive infinite variability of the transmission, the low ratio high torque region has to be passed through before entering a lower torque region. Thus, if high torque is present initially, and the wheels lose their traction, wheel-spin occurs, and if initially the wheels do not lose their traction, the tractor and its draught load are subject to a high initial acceleration which might damage the tractor or its trailer or endanger the load.

An object of the present invention is to limit the initial torque developed by a tractor to a safe and useful level by making use of the fact that, in general, the pressure difference across a hydraulic motor of fixed capacity is constant when the output torque is constant, but if the capacity is variable, then constant torque can only be obtained by ensuring that the product of capacity and pressure difference is constant. In a practical hydrostatic transmission, the motor capacity is usually about three times that of the pump, and the motor is used at full capacity only over the first quarter of the speed range; and over the remaining three quarters of the speed range the capacity is progressively reduced. Therefore, to maintain a constant torque the pressure difference must be increased progressively to maintain a constant product of capacity and pressure difference.

Accordingly auxiliary control means is provided and is operative to override the main control means to ensure that any selected torque is not exceeded.

To operate the auxiliary control means, a pressure tapping is taken at 35 from the high pressure side of the motor 10 and is fed to a valve block 36 and acts therein upon a spool valve 37 The spool valve 37 is balanced from within the valve block 36 by a pressure plate 38 urged towards the spool valve by a variable rate spring 39. The spring 39 reacts on the head of a mushroom-shaped member 40 having a leg 41 slidable in a movable carrier 42 projecting from the valve block 36. A wedge 44 passes through the carrier 42 between it and the member 40 so that the latter may be selectively displaced for adjusting the force exerted by the spring 39 on the spool valve 37. The wedge 44 is movable to increase and decrease the load by a control member 45.

The spring 39 is additionally loaded when the capacity of the transmission is being reduced by the action of a cam 47 formed on the end of the lever 19 acting through the carrier 42, the wedge 41 and the mushroom-shaped member 40.

Sufficient movement of the spool valve 37 away from its equilibrium position permits a low pressure fluid supply to be transmitted from an engine driven pump 48 through a pressure line 49 to a pair of fluid pressure actuated ram units 50 via a pressure line 51. One only of the ram units 50 is operable when the lever 19 is not central to return the latter towards a central position.

Figure 2:
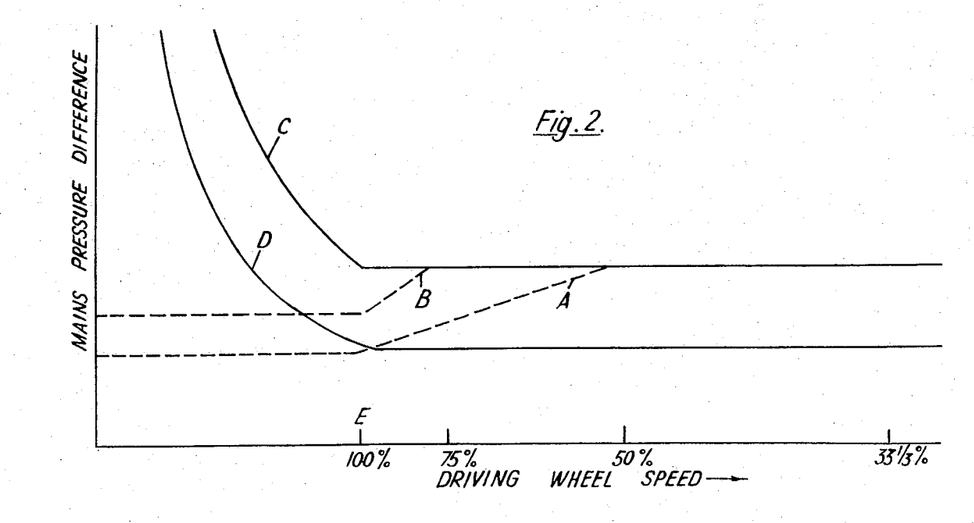
FIG. 2 is a graph showing a relationship between mains pressure difference across the motor and driving wheel speed.

FIG. 2 shows on a graph with mains pressure difference as ordinate and driving wheel speed as abscissa, curves A and B of constant torque and curves C and D of constant horsepower. These four curves are illustrative of a family of such curves.

Considering now FIGS. 1 and 2 together and curve A in particular, it will be seen that up to the point E the motor capacity remains constant at its maximum and the torque will thus be proportional to the pressure difference across the mains. In this region, the pump swash plate 8 is increasing towards its maximum which is reached at E. Assuming the wedge 44 is set in the position shown in FIG. 1 corresponding to a certain spring load on the spool 37, and the lever 19 is moved so that an excessive mains pressure is built up in the transmission, the mains pressure moves the spool 37 to permit low pressure fluid to reach the ram units 50 and one of these pushes the lever 19 back towards its central position until the transmission mains pressure is reduced when the spool valve closes again. Thus, in the constant capacity range of the transmission any tendency for the mains pressure to exceed a value determined by a load setting on the spool valve results in a corrective measure by the auxiliary control on the main control without effecting the hand setting of the main control means. This is permitted by the pre-loaded strut-and-tie device 18. It is possible to make the auxiliary control work directly on the main control means hydraulically.

Still referring to curve A, it will be seen that once the capacity of the motor has begun to reduce, the pressure necessary to provide a given torque rises. Since the loading on the spool valve 37 governs the operation of the latter, it is necessary in this reducing capacity region to increase the load by the cam 47 acting through members 42 and 40 on the spring. Thus, the greater the speed ratio selected by the lever 19, the greater will be the mains pressure required to make the spool valve 37 operate.

If the spring 39 were a constant rate spring the actual pressures at which the spool valve 37 would operate, would increase according to the slope of curve A (say) for all torque settings. This means that, for the wedge position corresponding to curve B, the sloping portion of the latter would be parallel to that of curve A. This is not desirable because the torque at which the spool valve 37 would operate would then be lower than that demanded by the setting. To correct this the spring 39 is arranged to be a variable rate spring, the variation of which gives substantially the required slopes of the various torque curves.

Further auxiliary control means capable of protecting the engine 3 when it is in danger of stalling by reducing the power demand of the transmission thereon consists of a second spool valve 52 in the valve block 36 operable by a signal originating from the engine to permit low pressure fluid to reach the rams 50. Operation of the rams 50 reduces the transmission ratio as before, thus reducing the power demand on the engine. The engine originating signal is one which indicates that the engine maximum power is about to be or is exceeded.

The spool valve 52 is spring loaded at one end by a helical spring 53 bearing against a pressure plate 54 abutting the end of the spool 52. At the other end, the spool valve 52 is subject to forces from a fluid pressure mechanism such as a diaphragm 52a or a piston and cylinder operated by the engine originating signal which is a fuel pressure signal.

The fuel pressure signal is derived from the fuel pump 2 of the engine 1 and is a relatively low pressure. In certain types of fuel pump a device may be introduced into the pump which gives a pressure signal which falls as the power output of the engine increases. Moreover, the pressure signal is approximately the same at all speeds of the engine while it is delivering maximum power. Hence, when the value of the pressure signal reaches the pressure corresponding to maximum power, it operates the spool valve 52 to decrease the transmission ratio so that the power demand on the engine is reduced.

The manner in which the engine originating pressure signal is transferred to the further auxiliary control forms no part of the present invention.

At any power condition of the engine below full power, the pressure signal is strong enough to bias the spool valve 52 to a position in which it prevents communication between a low pressure supply passage 55 and the line 51 to the rams 50. A drain 56 is provided for chambers 57 and 58 which may collect leakage fluid. When the maximum power of the engine is approached the spool valve 52 is moved against the reducing pressure signal to permit the low pressure fluid to operate on rams 50. The power at which the spool valve 52 operates is set by an adjustment screw 59 which pre-loads the spring 53 to the required degree.

Figure 3:
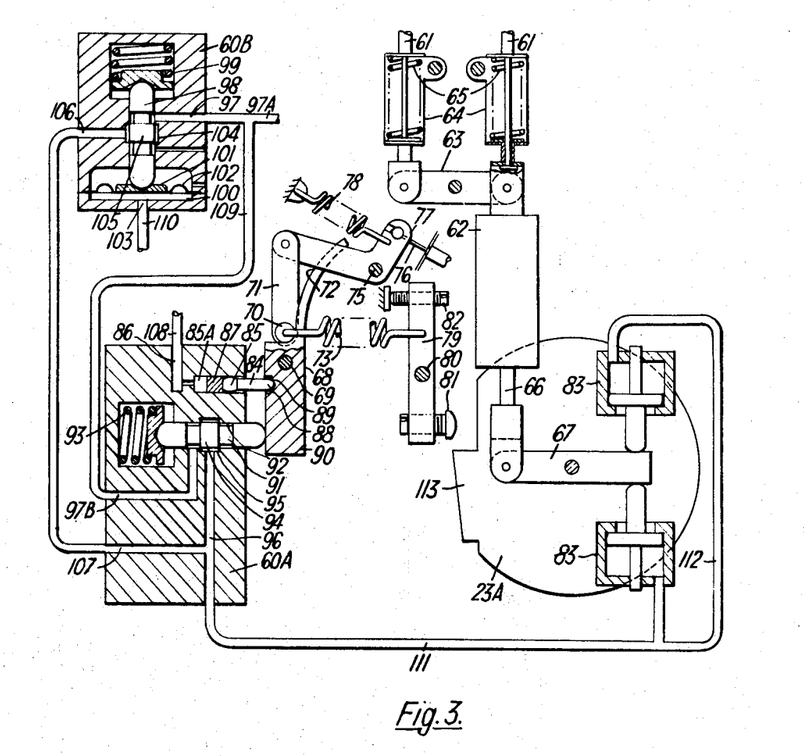
FIG. 3 is a view corresponding to FIG. 1 and showing another embodiment.

In the embodiment shown in FIG. 3 there is a control cam 23A and a valve block 60A as in the first described embodiment. The main control system in this embodiment includes a pair of cables 61, both movable by a control lever (not shown) and both operable on a spring-loaded strut-and-tie device 62 through a balance lever 63. The cables 61 pass through tubes 64 each enclosing a compression spring 65 pre-loaded so as to move the lever 63 to a position corresponding to a neutral condition of the transmission should one of the cables break. This feature is an important one insofar as the transmission would otherwise be uncontrollable in the event of cable failure. The strut-and-tie device 62 is similar to the device 18 in FIG. 1 and a rod 66 which forms part of the strut-and-tie device 62 is pin-pointed to a main control lever 67 with which the cam 23A is movable.

The auxiliary torque control means has a balanced lever 68 pivoted on a pin 69 fixed to a stationary part. A roller 70 carried by a link 71 at one end thereof is urged into engagement with a curved track 72 on the lever 68 by a spring 73. The link 71 is pin-pointed to a bell-crank lever 74 pivoted at 75 on a fixed part of the transmission assembly. A torque setting control is provided in the form of a cable 76 having a pivotal connection with the arm 77 of the bell-crank lever 74. The arm 77 is connected to a fixed part of the transmission by a tension spring 78.

The spring 73 extends between and is connected to the roller 70 and to an end of a lever 79 pivoted intermediate its ends at 80 on a fixed part of the transmission assembly. An adjustable button 81 and an adjustable stop 82 are also carried on the lever 79 at the ends remote from the spring 73.

Ram units 83 exert a centralising influence on the control lever 67. The valve block 60A is located adjacent the balance lever 68 and these two are operatively connected by a thrust rod 84 and a spool valve 85.

The thrust rod 84 is located in a bore 85A in the valve block 60A connected to the mains high pressure inlet 86. A seal 87 prevents leakage of fluid and a domed head 88 on the rod 84 seats in a recess 89 in the balanced lever 68. A tongue 90 on the balanced lever 68 prevents a three land spool 91 from emerging from a bore 92 in the block 60A under the force exerted by a biasing spring 93. The centre land 94 normally seals a gallery 95 connected to the ram supply passage 96. The low pressure supply pipe 97A for the rams connects to low pressure supply passage 97 in a valve block 60B and is ducted past a horsepower control spool valve 98 in the valve block 60B via a passage 97B to the bore 92 in valve block 60A.

The valve 98 also has three lands and is urged in one direction by a spring 99 and in the other direction by the action of fuel under pressure in a chamber 100 acting through the central thrust plate 101 of a diaphragm 102. The fuel is admitted to chamber 100 through passage 103. A gallery 104 surrounding the central land 105 of spool 98 connects with the ram supply passage 96 through a passage 106, and a passage 107 in the block 60A.

External pressure pipes are provided as follows: in pipe 108 from the valve block 60A to the motor to carry the mains pressure, a pipe 109 from the pump 48 to the valve block 60A to carry the low pressure supply, a pipe 110 from the engine fuel pump 2 to the valve block 60B to carry the engine signal pressure, a pipe 111 from the valve block 60A to the ram units to carry the ram pressure supply, and a pipe 112 between the ram units to equalise the ram pressure supply.

The cam 23A carries an auxiliary cam plate 113 which co-operates with the button 81 in a manner to be described later.

The operation of the transmission control shown in FIG. 3 is as follows.

Cam 23A is rotated by means of the lever 67 and the remainder of the main control elements 61 to 67. If a torque in excess of a pre-set value is imposed on the motor, the result is a movement of the balanced lever 68 in an anti-clockwise direction thus allowing the spool 91 to be biased by the spring 93 so that the land 94 on the spool 91 uncovers the gallery 95 and allows low pressure fluid to flow to the ram units 83. The ram units 83 then override the main control means so as to move the cam 23A to a position in which the mains pressure is reduced. The setting of the main control means remains unaltered by virtue of the strut-and-tie device 62.

The forces acting upon the balanced lever 68 are those exerted by the spring 73 through the roller 70, by the thrust rod 84 and by the spring 93 through the spool 91. The forces exerted by spring 73 when the roller 70 is in the position shown in FIG. 3 and by the spring 93 when the spool valve 91 is in its equilibrium position, that is when the land 94 is about to expose the gallery 95, are such that their moments about pin 69 cancel each other. Thereafter, the moments applied to the balanced lever 67 are due to the force exerted by the thrust rod 84 and the change in geometry as the roller 70 moves along the track 72 from the position shown while the position of the lever 79 is maintained. Accordingly, if the roller 70 is displaced to the end of the track 72 remote from the pin 69 by the cable 76 acting through the bellcrank lever 74 and link 71, the mains pressure required to balance the lever is increased. Because the centre of the arc of the track 72 is arranged to be approximately at the end of the spring 73 remote from the roller 70 there is no increase in length of the spring 73 while the position of lever 79 is maintained and the increase in mains pressure is therefore substantially directly proportional to the angular displacement of the roller 70. Should the mains pressure rise sufficiently to unbalance the lever 68 and the spool 91, the main control will be overriden in the manner described.

As explained with reference to FIGS. 1 and 2, it is necessary for both the mains pressure and the motor swash-plate angle to be taken into account when the motor is no longer of constant capacity. This requirement is taken into account in the present embodiment by arranging that the auxiliary cam 113 begins to lift the button 81 when the cam 23A is beginning to cause capacity-reducing movement of the motor swash-plate. Clockwise rotation of the lever 79 causes the spring 73 to extend and progressively increase the force on the roller 70 when the latter is maintained in the same position throughout the increase. Such an increase in force causes an increase in the mains pressure required to equilibrate it. If the cam 113 lifts the button 81 at a uniform rate with the increase in the angle of the cam 23A, this uniformity is reflected in a uniform mains pressure increase required for equilibrium. The mains pressure increase is illustrated by the sloping portion of curve A in FIG. 2. By making the lift of cam 113 non-uniform the sloping portion of the mains pressure curve may be adjusted to suit any particular requirement.

If the torque level at which the auxiliary torque control is required to operate is increased, for example to the level of curve B of FIG. 2, the roller 70 is moved to a new position further out along the track 72. When the motor is in its decreasing capacity range, the cam 113 lifts the button 81 as before but the increase in force due to extension of the spring is coupled with the change in geometry, and the combined effect of both is to give the sloping portion of curve B a steeper gradient than the corresponding portion of curve A. This, of course, is desirable because of the requirement that the product of the capacity and the pressure should be constant.

The embodiment described with reference to FIG. 3 has the advantage that it is the profile of cam 113 which controls the slope and since a greater accuracy can be obtained by forming a cam according to a certain shape rather than by making a spring which will give desired characteristics, as would be required by the embodiment of FIG. 1, the FIG. 3 embodiment is preferred.

The control over the horsepower delivered by the engine is the same as that described with reference to FIG. 1.

It is sometimes the case that the manually actuated parts of the control system are extremely sensitive to disturbance and any small force acting on them will upset the setting selected by the vehicle driver. The circuits of FIGURES 1 and 3 are arranged so that the reaction to the high pressure signal from the circuit is carried through, in the case of FIGURE 1, pressure plate 38, spring 39, pressure plate 40, leg 41, wedge 44 and carrier 42 to react on the cam 47 on the manually controlled side of the system. Likewise in the system shown in FIGURE 3 the button 81 reacts on the cam surface 113 and the force of reaction may be sufficient to interfere with further movement by the cam plate 23A and cause compression of the pre-loaded strut and the member 62.

In servo controlled systems where the manual side of the system is sensitive it can be arranged that the reaction to the high pressure circuit signal is carried by the "power" side of the control system where forces involved are so large as to be unaffected by reaction forces of the order of those set up by the torque control. Such an arrangement is shown in FIGURE 4.

Figure 4:
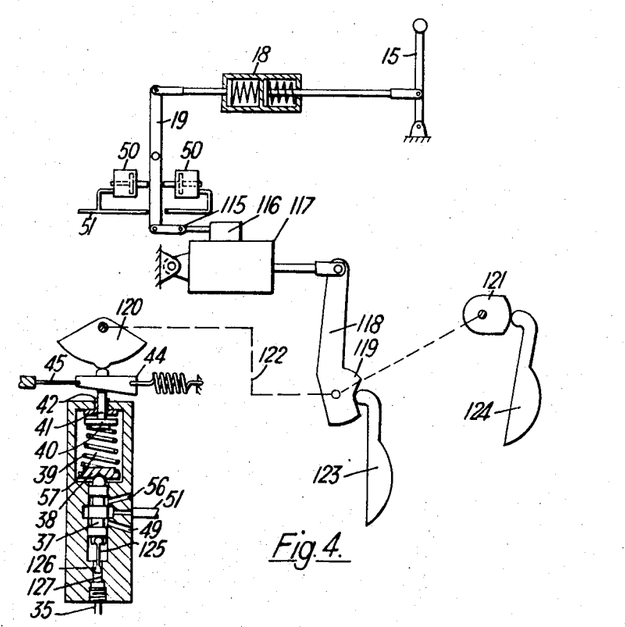
FIG. 4 shows a control layout in diagrammatic form which is similar to that of FIGURE 2 and which is suitable for control systems in which the manual side is extremely sensitive.

The hand lever 15, preloaded strut and tie 18, lever 19 are present in FIGURE 4 as in FIGURE 1, together with the centralising rams 50. The lever 19 in this case is operative through a link 115 on servo spool valve 116 attached to a single large ram 117. The ram 117 moves a master lever 118 which carries a pump swashplate cam 119 and is operatively connected with the torque regulating cam 120 and the motor swash-plate cam 121. The operative connection between the master lever 118 and cams 120 and 121 is represented by broken line 122 which can be a shaft or any connecting combination of parts which ensures that the three cams 119, 120 and 121 move in unison. The cams 119 and 121 are operative to tilt the pump and motor swash plates 123 and 124 respectively in a predetermined manner, cam 119 being provided with sufficient power to compress the spring 39.

In FIGURE 4, as in FIGURE 1, the parts of the torque control valve are the same and are similarly referenced. In FIGURE 4, however, the high pressure signal from conduit 35 is transmitted to the spool valve 37 through the intermediary of a piston rod 125 having a barrel shaped piston 126 fluid tightly slidable in a small cylinder 127 fed from conduit 35.

The high pressure signal acting through piston 126 and the other elements of the torque control valve is reacted ultimately on cam 120. Thus in this control arrangement the reaction from the high pressure signal does not upset the selection, and the compression of the spring 39 is effected with the aid of the servo.

One further feature of the control system shown in FIGURE 4 is that a single ram 117 provides power for both the pump and motor swash plates 123 and 124 respectively. In certain types of hydrostatic transmission, e.g. that illustrated in FIGURE 5, this can be of advantage where space is at a premium.

Figure 5:
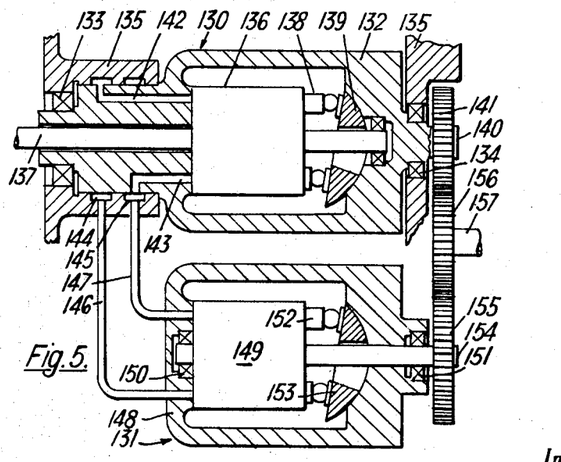
FIG. 5 shows an arrangement of hydrostatic transmission of the hydromechanical or "split path" type suitable for control by the present invention.

In FIGURE 5 a swash plate pump 130 is arranged to supply a swash plate motor 131 with hydraulic fluid but its casing 132 is supported for rotation on bearings 133 and 134 on a fixed housing 135. The pump block 136 is rotatably supported within the casing 132 and is driven by an input shaft 137. Pistons 138 project into abutment with the pump swash plate 139 which is tiltable relative to the casing 132 and rotatable with it. The casing 132 has at one end a projecting shaft 140 to which is splined a gear wheel 141, and at the other a pair of conduits 142 and 143 which terminate at the block 136 and galleries 144 and 145 respectively, the latter being formed in the fixed housing 135. External conduits 146 and 147 connect the galleries 144 and 145 respectively to the motor casing 148. The motor piston block 149 is rotatable on bearings 150 and 151 in the casing 148 and the motor pistons 152 abut the motor swash plate 153 which is tiltable and now rotatable. A shaft 154 drivingly connects the motor block 149 with a gearwheel 155 which together with gearwheel 141 meshes with an output gear-wheel 156, the latter being secured to the output shaft 157.

The transmission illustrated in FIGURE 5 is a hydromechanical or "split path" transmission, the two paths being:

(a) The hydraulic path from the pump block 136 through conduits 142, 143, galleries 144, 145, conduits 146, 147, motor block 149, shaft 154 and gearwheels 155 and 156 to output shaft 157.

(b) The mechanical path from pump block 136 through pistons 138, swash plate 139, casing 132, shaft 140 and gearwheels 141 and 156 to shaft 157.

The movement of the swash plates 139 and 153 is sequential in two phases, the pump swash plate 139 moving from zero angle to a maximum while swash plate 153 remains at a fixed angle and subsequently the swash plate 139 remains at its maximum angle while the swash plate 153 angle is reduced to a minimum. The two phases are shown in FIGURES 6 and 7 on each side of transmission ratio $R_2$ which is the ratio at which transition takes place.

Figure 6:
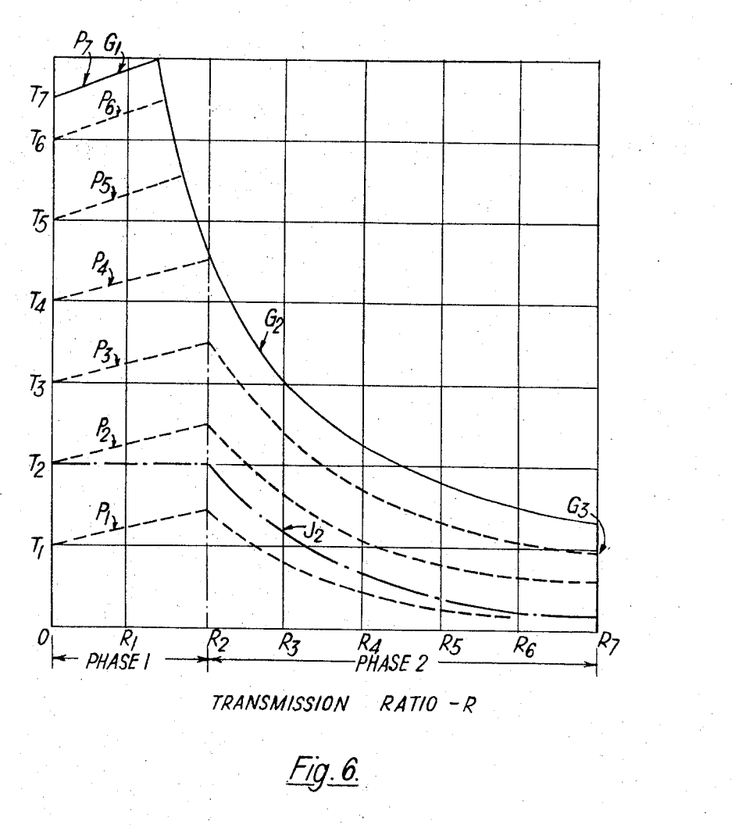
FIGS. 6 and 7 are graphs of torque v. transmission ratio and circuit pressure v. transmission ratio respectively for the transmission shown in FIG. 5.
Figure 7:
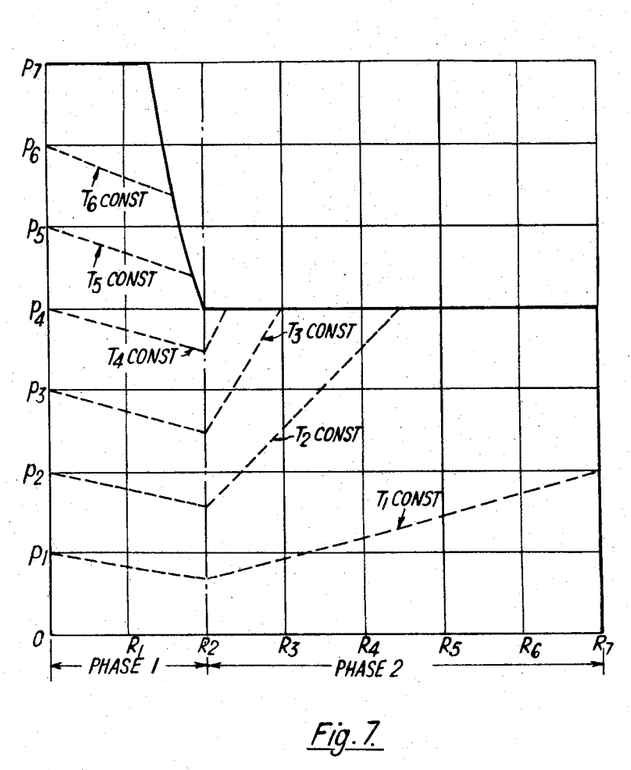

Considering FIGURE 6 for the moment, the vehicle, which for example is a tractor, operates within the closed envelope defined by the ordinates and the lines $G_1$, $G_2$ and $G_3$ which meet. The boundary $G_1$ represents the torque applied to the tractor which would cause the relief valve in the transmission hydraulic circuit to spill. Line $G_2$ is a hyperbola and represents the horsepower available from the tractor engine. The line $G_3$ is a limitation imposed on the transmission by the minimum setting of the motor swash plate.

Several dotted lines P1–6 on the graph FIGURE 6 represent torque at control pressure, and one of these, P2 will now be discussed in detail. For any chosen hydraulic transmission pressure P2 the torque developed by the whole transmission at any chosen ratio is the ordinate of the corresponding point on P2. The total torque P2 in phase 1 is made up of a torque represented by J2 transmitted through the hydraulic path and the balance of torque transmitted through the mechanical path. In phase 1 the greater proportion is carried hydraulically and is initially, at very small transmission ratios, wholly hydraulic. This is because the pump swash plate angle is so small that the component of piston reaction to drive the pump casing 132 is insignificant. If the pump swash plate angle is precisely zero then no torque at all is developed. As the pump swash plate angle increases from zero or a very small angle to its maximum the mechanical component increases substantially linearly so that the peak torque occurs at transition i.e., at ratio $R_2$ when the pump capacity is a maximum and the motor capacity is beginning to reduce.

Subsequent to transmission the mechanical component will not vary and only the torque through the hydraulic path will change. The manner of its change is shown by chain dotted line J2 in phase 2, FIGURE 6. At the higher ratios the proportion of torque carried mechanically can exceed the torque transmitted through the hydraulic path to an extent that when the motor capacity is reduced to zero the drive is wholly mechanical. Hence the total torque capable of being carried by the transmission shown in FIGURE 5, while a constant pressure P2 is maintained in the hydraulic part of the transmission, is represented by the line P2.

Lines P1 to P6 indicate the torque carried when pressures P1 to P6 respectively are maintained in the hydraulic circuit.

It should be noted that the line P4 reaches the line $G_2$ at transition, and accordingly the transmission does not progress into phase 2.

Lines P5 and P6 do not even extend to the transition ratio $R_2$.

The torque T6 for instance can be arranged to be one of the design criteria of the tractor, i.e., the torque which corresponds to the rated drawbar pull at zero forward speed torque T2 corresponds to the relief valve blow-off pressure.

FIGURE 6 which is a graph of torque versus transmission ratio can be transformed into a graph, FIGURE 7, of pressure versus transmission ratio. Lines of constant torque T1 to T6 can then be represented on it.

To sense a constant transmission torque it is necessary to sense a varying pressure in the hydraulic circuit, the variation being governed by the constant torque lines in FIGURE 7.

Figures 8, 9:
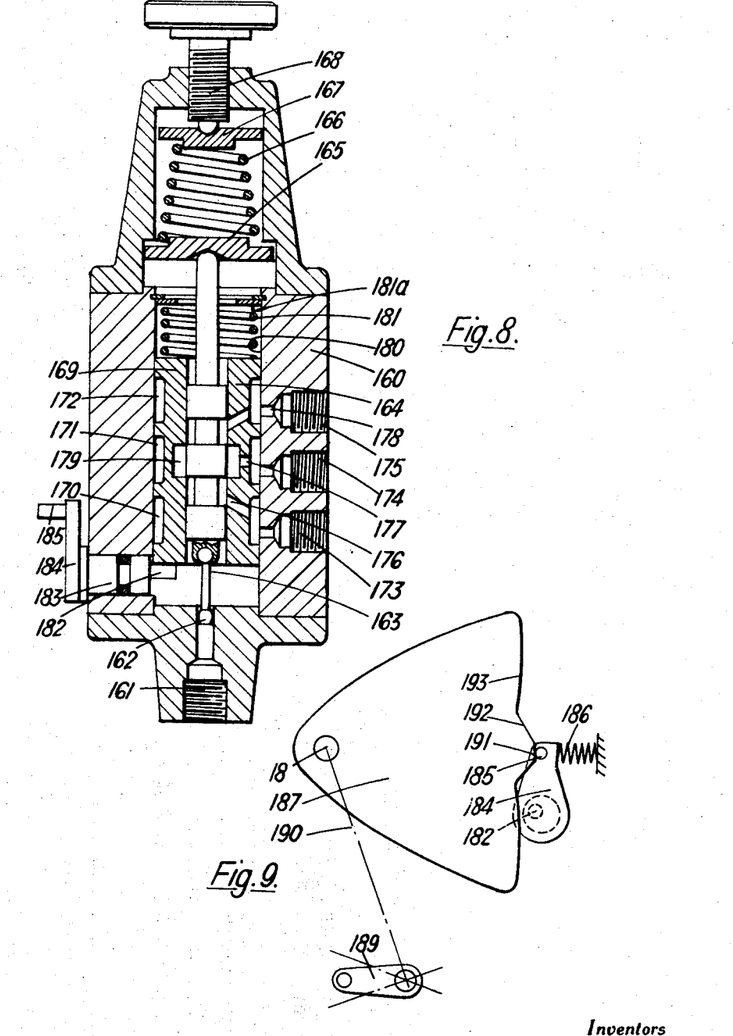
FIG. 8 is a torque control valve suitable for controlling the torque in any hydrostatic circuit.
FIG. 9 is a diagrammatic illustration of the type of cam necessary to regulate the valve of FIG. 8 to give a constant torque output in the transmission of FIG. 5.

The torque control shown in FIGURE 8 has an outer body 160 with an inlet 161 for the high pressure connection with the hydraulic circuit, and a barrel shaped piston 162 with attached piston rod 163 for transmitting forces to a three land spool 164. The opposite end of the spool abuts a first pressure plate 165 loaded through a spring 166 and second pressure plate 167 by a screw-down adjustment knob 168 threaded into the top end of the body 160.

The spool 164 is substantially fluid tightly slidable in a sleeve 169 provided with three external galleries 170, 171 and 172, which are always in communication with the pressure supply port 173, the ram port 174 and the exhaust port 175. Drillings 176, 177 and 178 connect the respective galleries with hte interior of the sleeve 169, the middle drilling 177 communicating with an interior gallery 179. The sleeve 169 is slidable in a cylinder 180 formed in the body and is spring urged downwardly by light spring 181, located between the stop 181a and the top of the sleeve, into abutment with a movable stop 182 carried eccentrically on a short shaft 183 rotatable in the body 160. Externally of the body 160 a crank 184 is fixed to the shaft and carries a cam follower constituted by a pin 185.

Referring to FIGURE 9, a spring 186 presses the pin 185 into abutment with a cam plate 187 carried on a shaft 188 solid with the lever 189. The lever 189 can represent the lever 118 of FIGURE 4 or the lever 19 of FIGURE 4. In the case where the lever 189 represents lever 19 of FIGURE 4 and in view of the fact that the springs 181 and 180 are light, the reaction forces arising from movement of the sleeve 169 are very small and do not upset the relatively sensitive manual part of the actuating system. The broken line 190 indicates diagrammatically the solid connection reterred to. The cam surface above the pin 185 in FIGURE 9 has a dwell portion 191, a phase 1 portion 192 and a phase 2 portion 193.

In operation the torque level is set by screwing down the adjustment knob 168, a desired amount, and the manual control is moved to a chosen ratio. The lever 189, follows the manual control and in so doing rotates the cam plate 187. The follower pin 185 follows the cam contour and sets the height of the sleeve 169 accordingly, so that the spool 164 has to be raised a corresponding height before it permits pressure from supply port 173 to pass through gallery 170 and drilling 176, into gallery 179. Once the pressure fluid reaches gallery 179 it can flow through drilling 177 and ram port 174 to the centralising rams 50, one of which overrides the manual control and reduces the transmission ratio.

When the follower pin 185 is moving along the phase 1 portion 192 of the cam 187 from the neutral position it is actually lowering the sleeve 169 thus lowering the height to which the spool 164 has to be raised by the hydraulic circuit pressure against spring 166 before correction takes place. Consequently the pressure in the transmission hydraulic circuit required to effect correction is reducing as required by one of the constant torque lines on FIGURE 7. When the pin is moving along the phase 2 portion 193 the sleeve 169 is being raised, thus raising the height to which the spool 164 has to be raised to effect correction in accordance with the requirement of one of the constant torque lines in phase 2 of FIGURE 7.

The portion of the cam 187 below the follower as seen in FIGURE 9 has the same shape as that above and is used for conditioning the torque control valve when the vehicle is in reverse.

The gearwheels 141 and 151 can be in mesh with separate output shaft gears to give desired characteristics.

In any hydrostatic transmission so long as the variation of transmission hydraulic circuit pressure to achieve a constant torque is known or can be found, such a pressure can be used with the aid of a suitably shaped cam and the control valve of FIGURE 8 to impose a desired limit on the torque exerted by the transmission. Such an arrangement could for example be used where multiple pumps and/or motor are employed in combination or singly in hydromechanical differential or hydrostatic transmission which do not have a mechanical path.

The transmission control enables the tractor driver to pre-set the transmission to prevent the on-set of wheel spin and maintain a steady tractive effort even down to a stationary condition. A steady tractive effort down to zero forward speed is desirable, for example, in the case of a tractor equipped with a front bucket because the tractive effort applied by the tractor should be sufficient to fill the bucket even though the tractor may eventually be halted by the filling operation.

Clearly the invention is applicable to any hydrostatic transmission employing a pump and motor arrangement in which the pattern of behaviour of the motor in response to changes in control parameters is known and can be sensed, the pressure signal derived therefrom being used to effect such changes in the parameters as will prevent the transmission from developing an output torque in excess of a certain preset value. For instance, the invention could be used in a hydromechanical transmission of the split path or "shunt" type, so long as the normal control characteristics (these in this case, being the control positions) of the transmission were known or could be established easily.

We claim:

1. A hydrostatic transmission including a fluid pump, a fluid motor, main control means for regulating the speed ratio of the transmission, there being a pressure drop across said motor for any torque value that varies in accordance with the speed ratio, auxiliary control means responsive to said pressure drop and operable to adjust said main control means to reduce the speed ratio during loading of said transmission over a predetermined amount and pressure compensation means responsive to the setting of the main control means and acting on said auxiliary control means to compensate for such variable pressure drop.

2. A transmission according to claim 1, wherein the normal control means comprises a manually actuated control element, a follow-up hydraulic servo-device responsive to movement of said control element, and a hydraulically actuated element responsive to movement of said servo-device, and wherein the compensating means is controlled by said hydraulically actuated element.

3. A transmission according to claim 1, wherein the normal control means comprises a manually actuated control element, a follow-up hydraulic servo-device responsive to movement of said control element, and a hydraulically actuated element responsive to movement of said servo-device and wherein the pressure compensating means is operated by said manually actuated control element.

4. A transmission according to claim 1, wherein said auxiliary control means includes valve means and a fluid pressure actuator operable to move the main control means to reduce the transmission ratio, the valve means comprising a valve element movably responsive to the approximate pressure drop in the transmission and balanced against such movement by spring means, setting means operable on the spring means for selectively varying the preload applied to the valve element, ports hydraulically connecting said valve means with a pressure source and said actuator and arranged so that sufficient movement of said valve element connects said source with said actuator to cause ratio reducing movement of the main control means.

5. A transmission according to claim 4, having a lever connected to move said valve element, said lever acted on by said transmission pressure and a spring, the arrangement being such as to permit the spring to exert force on the lever through a controllable range of moment arms.

6. A transmission according to claim 4, wherein said pressure compensating means comprises a cam and the said spring means.

7. A transmission according to claim 6, wherein said spring means comprises a spring of variable rate.

8. A transmission according to claim 4 wherein said pressure compensating means comprises a sleeve fluid tightly encircling said valve element and movable in a predetermined manner in accordance with the transmission ratio in relation to the valve element, the valve ports being placed in said sleeve so that the valve element has to be moved along the sleeve by a varying amount by the transmission pressure in order to place the pressure source in communication with the centralizing actuator.

9. A transmission according to claim 1 wherein said auxiliary control means is also responsive to a signal derived from the engine to adjust the main control means to reduce the speed ratio when the maximum power that can be delivered by the engine is in danger of being exceeded by the power demand on the engine.

References Cited
UNITED STATES PATENTS

| | | | |
|---|---|---|---|
| 2,326,821 | 8/1943 | Boyle | 60—19 |
| 2,516,662 | 7/1950 | Vickers | 60—19 X |
| 2,862,456 | 12/1958 | Bauer | 60—53 X |
| 2,976,685 | 3/1961 | Thoma et al. | 60—19 X |
| 3,003,309 | 10/1961 | Bowers et al. | 60—19 |
| 3,126,707 | 3/1964 | Hann et al. | 60—53 |
| 3,166,891 | 1/1965 | Weisenbach | 60—19 |
| 3,171,247 | 3/1965 | McAlvay | 60—19 |
| 3,238,724 | 3/1966 | Miller | 60—53 |
| 3,284,999 | 11/1966 | Lease | 60—19 |

EDGAR W. GEOGHEGAN, *Primary Examiner.*